United States Patent [19]
Stokes et al.

[11] 3,912,385
[45] Oct. 14, 1975

[54] MULTI-MEDIA PROJECTOR STAND

[75] Inventors: John R. Stokes, Austin; James R. Morphew, Garland; James R. Benes, Austin; Eric N. Broline, Austin; Robert E. Harlan, Austin, all of Tex.

[73] Assignee: Columbia Scientific Industries Corporation, Austin, Tex.

[22] Filed: July 2, 1973

[21] Appl. No.: 375,612

[52] U.S. Cl. .................................. 353/94; 353/122
[51] Int. Cl.² ........................................... G03B 1/48
[58] Field of Search ............ 353/94, 7, 6, 119, 122, 353/48, 30; 352/243; 248/11, 183

[56] References Cited
UNITED STATES PATENTS

| | | | |
|---|---|---|---|
| 439,420 | 10/1890 | McIntosh | 353/89 |
| 2,200,594 | 5/1940 | Diggins et al. | 353/121 |
| 3,359,855 | 12/1967 | Webb | 353/48 |
| 3,479,115 | 11/1969 | Lindsay | 353/6 |
| 3,586,278 | 6/1971 | Simons | 248/183 |

FOREIGN PATENTS OR APPLICATIONS

| | | | |
|---|---|---|---|
| 18,583 | 1889 | United Kingdom | 353/94 |

*Primary Examiner*—Harry N. Haroian
*Attorney, Agent, or Firm*—Arnold, White & Durkee

[57] ABSTRACT

A multi-media projector stand incorporating a support frame for movably and adjustably supporting two or more photographic image projectors of the slide or motion picture type in order that the projected images from the projectors may be coordinated in any suitable manner, such as by being superimposed, by being displayed alternatively or selectively, etc. One of the projectors may be partially adjusted by adjustment devices utilized to adjust the position of the support frame on a support on which the frame is to rest and may also be partially adjusted by an adjustment device that controls rotatable positioning of the projector about an axis defined in the support frame.

One or more other projectors may be universally supported by the framework in such manner that they may be rotatably adjustable about a plurality of axes in order that the image of the projectors may be precisely coordinated relative to the first projector. Pitch, roll and yaw axes may be defined by the support frame structure and the position of the respective projector may be precisely adjusted by pivoting or rotating the projector controllably about each of the three axes. The axes may additionally be movable one relative to the other in order to achieve effective universal positioning of the projectors.

17 Claims, 12 Drawing Figures

MULTI-MEDIA PROJECTOR STAND

FIELD OF THE INVENTION

This invention is directed generally to multi-media systems where two or more projectors may be employed to coordinate projected images in any desirable way on a projector screen. More specifically, the present invention is directed to the provision of a simple and low cost multi-media projector stand mechanism that may be utilized to precisely coordinate projected images from two or more photographic projectors supported by the stand.

BACKGROUND OF THE INVENTION

It is quite desirable both commercially and in the domestic environment to display projected images from slide projectors and from motion picture projectors in such manner that the projected images therefrom may be coordinated in any suitable way such as by being superimposed, by being shown simultaneously or alternatively or by being displayed in conjunction with recorded sound or with other entertainment media. Multi-media entertainment systems incorporating projected photographic images have in the past been generally restricted to commercial devices, however, primarily because of the high costs occasioned by the intricate nature of devices necessary for precise coordination of the projected images. Although very desirable in the domestic environment, high costs effectively prevent multi-media entertainment systems from gaining widespread use by the general purchasing public for use in the home.

Where two or more projectors are employed for the purpose of projecting coordinated images on a projector screen, it is typically necessary for the operator setting up the projectors to spend a considerable amount of time in setting up and coordinating the images of the projectors. It is desirable therefore to provide a multi-media projector stand that will effectively enable an operator to set up two or more projectors and coordinate the projected images thereof within a very short period of time.

It is therefore the primary object of the present invention to provide a novel multi-media projector stand that may be efficiently employed in both commercial and non-commercial establishments for effective and precise coordination of projected photographic images.

It is an even further object of the present invention to provide a novel multi-media projector stand that may be effectively employed to support two or even several projectors for the purpose of coordinating the projected images thereof.

It is an even further object of the present invention to provide a novel multi-media projector stand that incorporates parts that may be assembled to support two projectors for coordinating the projected images thereof or may incorporate coupled or stacked modular units that facilitate effective support of a multiplicity of projectors the projected images of which may be effectively coordinated in any desirable manner.

Among the several objects of the present invention is noted the contemplation of a novel multi-media projector stand that may also be employed as a storage housing for two or more projectors, facilitating both storage and use of the projectors without necessitating removal of the projectors from the stand and facilitating rapid set up time for coordinated operation of the projectors.

Other and further objects, advantages, and features of the present invention will become apparent to one skilled in the art upon consideration of the written specification, the appended claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise a support framework that is designed to support two or more projectors in such manner that the projected images from the projectors may be coordinated on a projector screen in any desirable manner. The framework may include a support base element from which may extend a pair of generally vertically disposed and parallel related support elements, the support elements being provided with projector carrier devices that are movably related to the respective support elements. The projector carrier elements may cooperate to define a pair of generally parallel pitch axes, disposed in generally horizontal and parallel relation. The projected image of one of the projectors may be properly oriented relative to a projector screen by adjusting the position of the projector carrier elements about the respective pitch axis and by coordinating the pitch adjustment with adjustment of the position of the base element by adjusting a plurality of base leveling or positioning devices carried by the base support element.

The projected image of the other projector or projectors may be adjusted relative to the projected image of the first projector by adjusting the position of the projectors relative to the respective pitch axis and by adjustment of the position of the projectors by means of cooperative adjusting devices that control the position of the projector relative to yaw and roll axes.

While the pitch axis of the first projector may be considered to be fixed relative to the support elements, the pitch, yaw and roll axes for the remaining projectors may be adjustable one relative to the other and relative to the support elements, thereby effectively constituting a universal adjustment system for precisely positioning the projected image of one or more projectors relative to the projected image of the first projector.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments.

In the Drawings.

DESCRIPTION OF PREFERRED EMBODIMENT

Figure 1:
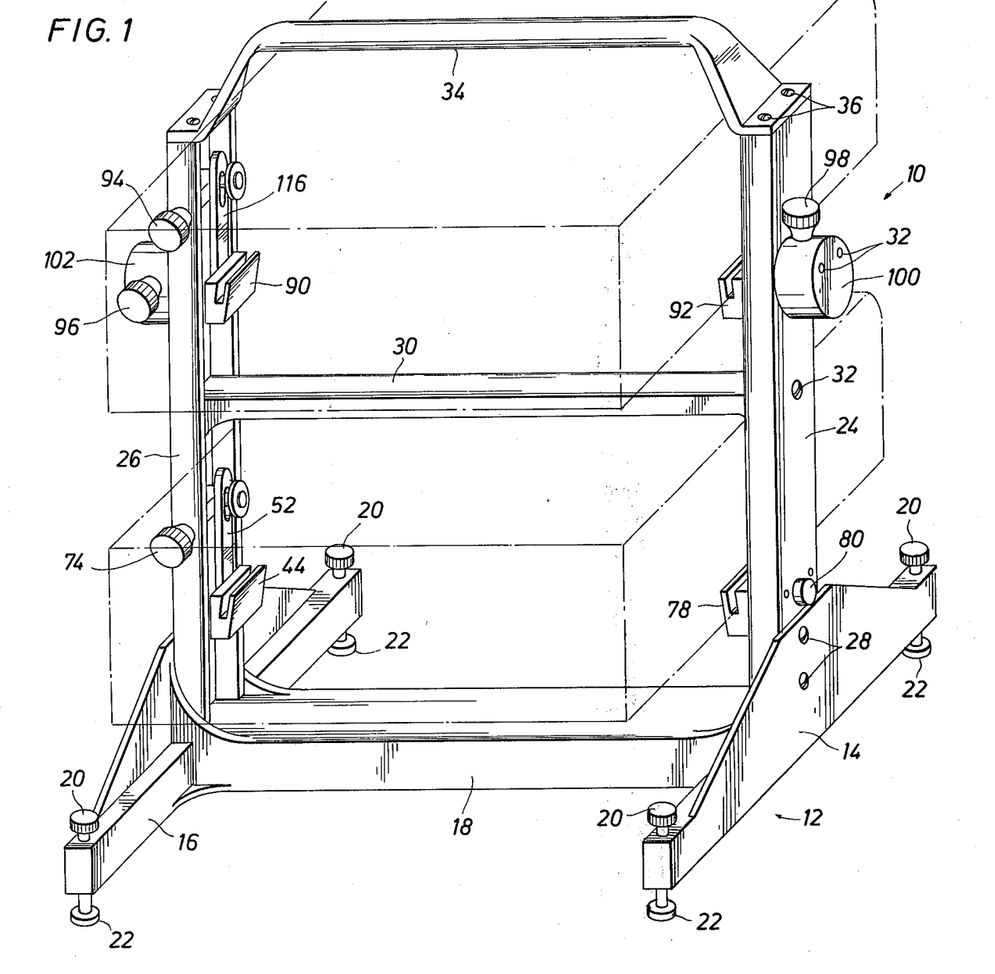
FIG. 1 is an isometric pictorial representation of a multi-media projector stand constructed in accordance with the present invention and providing means for movably and controllably supporting a pair of photographic image projectors.

Now referring to the drawings and first to FIG. 1, an isometric view depicts a multi-media projector stand constructed in accordance with the present invention, which projector stand, illustrated generally at 10, may include a base support element identified generally at 12 that may include a pair of support feet 14 and 16 which may be interconnected by means of a transverse brace 18. If desired, the support feet 14 and 16 and transverse brace 18 may be cast as an integral structure or in the alternative may be fabricated in any suitable manner. The position of the support base 12, relative to a support surface or support device upon which the projector stand may rest, may be adjusted by means of a plurality of adjustment screws 20 each having a support pad 22 disposed at the lower extremity thereof. The support pads 22, if desired, may be composed of any soft material that will not mar a surface upon which the projector stand may rest. The support pads may be composed of any one of a number of commercially available soft rubber-like materials having a padded, non-slip characteristic.

In accordance with the present invention, it is desirable to support two or more photographic projectors in such manner that the projected images from the projectors may be coordinated in any desirable manner, such as by superimposing or displaying the projected images side by side, etc. In accordance with the present invention, one suitable means of multiple projector support may be accomplished by positioning the projectors one above the other by means of movable projector carriers designed to accomplish precise manually controlled positioning of the projectors. In accordance with the present invention, vertical positioning or stacking of the projectors may be accomplished by providing a pair of vertical support elements 24 and 26 that may be disposed in generally parallel relation and may be connected to the respective foot portions of support base 13 by screws 28 or by any other suitable means of connection. An intermediate transverse brace 30 may be connected in generally horizontal manner to the vertical support elements 24 and 26 by means of screws 32 to lend structural integrity to the vertical support elements. A transverse carrier handle 34 may be secured by screws 36 to the upper extremities of the vertical support elements to enable the projector stand to be manually transported from place to place. The handle 34 also provides transverse structural support to further lend to the structural integrity of the projector stand.

As indicated above, it will be appropriate to mount two or more projectors in the projector stand in such manner that the projectors are somewhat movable in order to allow the projected images of the projectors to be properly coordinated on a projector screen. At least one of the projectors should be universally mounted within the stand in such manner that it may move about pitch, roll and yaw axes in order to facilitate positive and accurate alignment of the projected image of the second projector relative to the projected image of the first projector. This feature enables the projected images to be superimposed as desired or allows them to be displayed in any other suitable relation, depending, of course, upon the result that is desired.

The projected image of one of the projectors may be adjusted by adjusting the position of the projector about a single axis and by accomplishing further alignment or adjustment of the projected image by adjusting the particular position of the support base 12 of the projector stand on the surface or object upon which it rests by means of individual adjustment of the adjustment screws 20. In accordance with the present invention, controllable and adjustable mounting of a projector about a single axis, which may be referred to as the "pitch" axis, may conveniently take the form illustrated generally in FIGS. 1-3 where the lowermost projector is shown to be adjustably mounted for controlled movement about a pitch axis. Although the lowermost projector is shown to be mounted in this manner, it is not intended to limit the present invention to such mounting, it being obvious that the projector having single axis adjustment may be disposed above or to one side of a projector having controlled movement about multiple axes since the projectors need not be mounted in superposed relation such as depicted in the drawings.

Figure 2:
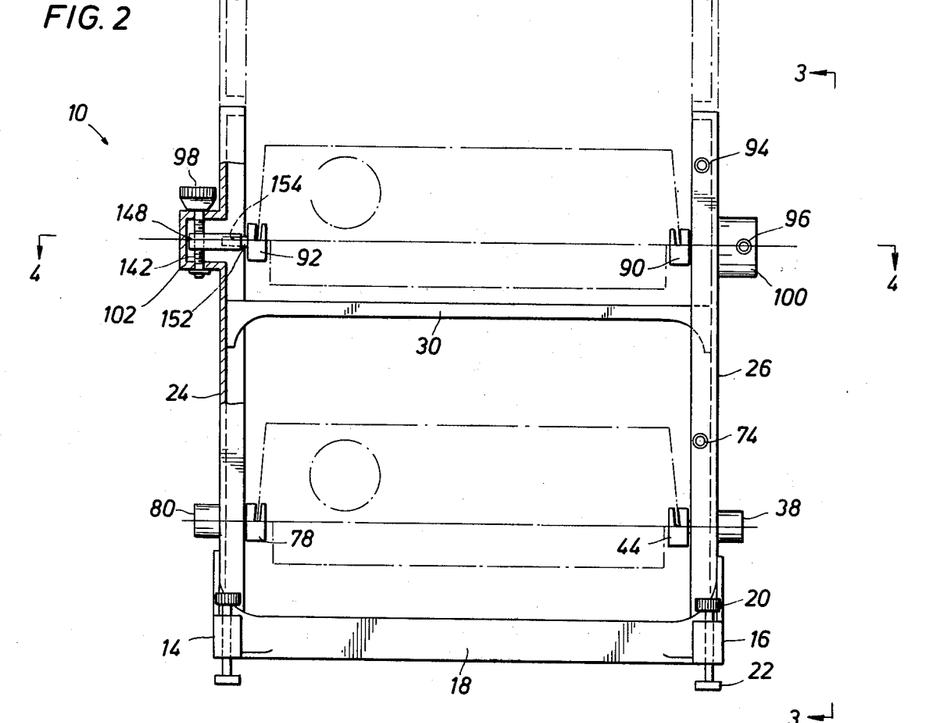
FIG. 2 is an elevational view of the projector stand assembly of FIG. 1 illustrating a pair of slide projectors being supported by the multi-media stand and further showing structure in phantom for similarly supporting other projectors.
Figure 3:
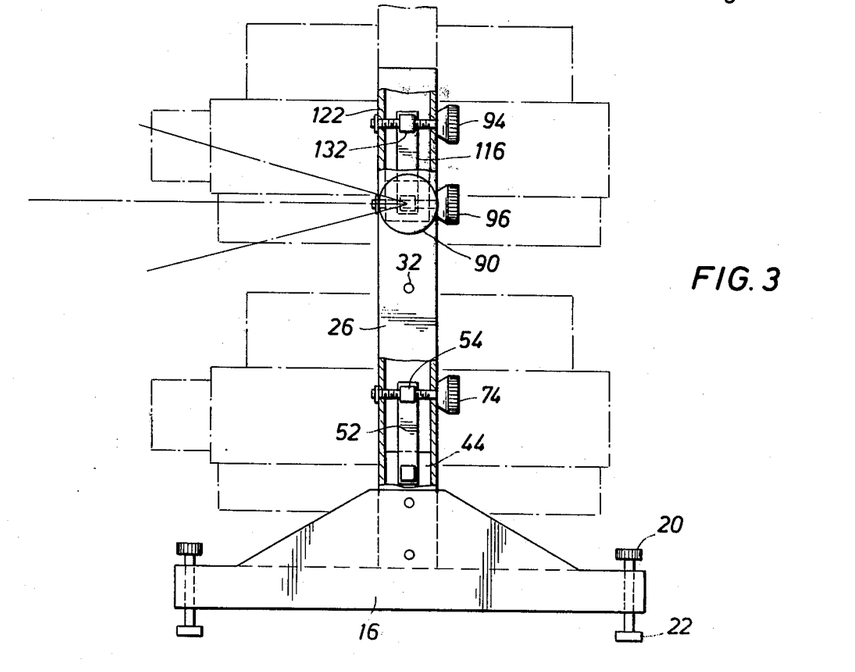
FIG. 3 is a side elevational view of the multi-media projector stand of FIGS. 1 and 2 taken along line 3—3 in FIG. 2, having parts thereof broken away and shown in section, illustrating pitch control assemblies for adjusting the pitch of the projectors relative to the projector stand.
Figure 6:
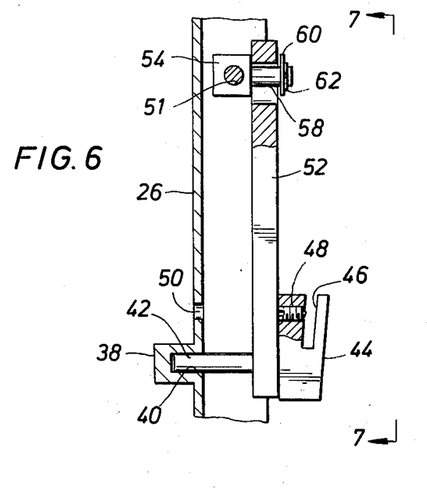
FIG. 6 is a fragmentary sectional view in elevation of a projector carrier mechanism including means for controlling the position of a projector carrier element about a pitch axis.
Figures 7, 9:
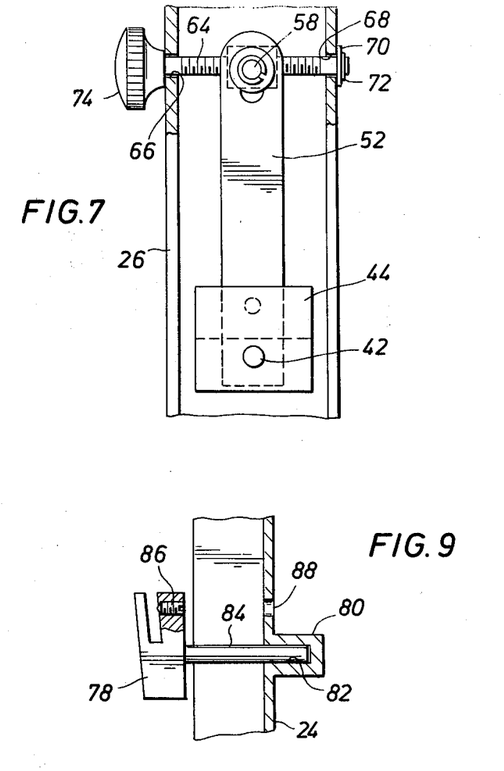
FIG. 7 is a fragmentary view taken along line 7—7 in FIG. 6, illustrating the pitch adjustment mechanism of FIG. 6 by means of a side elevation having a part thereof broken away and shown in section.
FIG. 9 is a fragmentary elevational view in partial section depicting the construction details of the lowermost projector carrier element of the invention.
Figure 8:
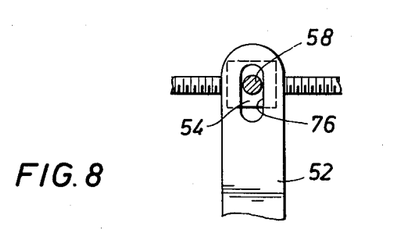
FIG. 8 is a fragmentary side elevational view of the pitch adjustment mechanism of FIG. 7 illustrating the lost-motion connection between the pitch actuating lever arm and the lever actuating pin.

With reference now to the detailed figures of the drawings, FIGS. 6, 7 and 8 depict the projector carrier mechanism disposed at the lower left hand portion of the projector stand assembly of FIG. 2 with the vertical support element 26 being constructed to define a boss 38 having a bearing journal 40 formed therein and receiving an axial shaft 42 of a projector carrier element 44.

Each of the projector carriers such as that depicted at 44 in FIGS. 6–8 may comprise a block of material such as aluminum, steel or any other suitable relatively rigid material, which material may be formed to define a slot 46 that may be of particular configuration to receive an edge portion of a projector housing in order that the projector housing may be rigidly coupled to the carrier element. As shown in FIG. 6, the slot 46 is angulated in such manner as to receive the edge portions of the housing of a projector manufactured and sold by Kodak Incorporated under the registered trademark "Carosel". Obviously, the slot 46 may be of any other suitable configuration, depending upon the particular construction of the projector it is designed to receive. It should also be borne in mind that it may not be necessary to provide a slot to receive the edge portions of a projector housing, it being obvious that any other suitable means of establishing a non-movable support relation between a projector and the carrier element 44 may be accomplished in any other suitable manner within the spirit and scope of the present invention.

For the purpose of positively securing the projector carrier to the housing structure of the projector, a plurality of set screws 48 may be received within threaded bores formed in the projector carrier element 44 and may be adjusted by means of an Allen wrench or any other suitable adjustment device that may be extended through adjustment openings 50 formed in the vertical support element 26.

It will be desirable to control pivotal movement of the projector carrier element 44 about its axial shaft 42 and, in accordance with the present invention, one suitable means for accomplishing controlled pivotal movement of the projector carrier element may conveniently take the form of an actuating lever or pitch adjustment arm 52 that may be immovably secured at one extremity thereof to the axial shaft 42 of the carrier element. An adjustment nut 54 having a threaded bore 56 formed therein may be secured to the free extremity of the adjustment arm 52 by means of a connecting shaft 58 that is retained in assembly with the arm 52 by a washer 60 retained by a snap ring 62 that is received within an appropriate snap ring groove formed in the shaft 58.

In order to cause controlled movement of the arm 52 about the pivotal axis defined by shaft 42, it will be desirable to provide a mechanism for imparting movement to the upper extremity of the adjustment arm 52 and for maintaining the adjustment arm in any particular position after it is adjusted. In accordance with the present invention, one suitable means for imparting controlled movement to the free extremity of the adjustment arm may conveniently take the form of a threaded adjustment shaft 64 shown in FIG. 7 that may be journalled for rotary movement relative to the vertical support 26 by opposed bearing apertures 66 and 68. The threaded shaft 64 may be maintained in rotatable assembly with the support arm 26 by means of a thrust washer 70 that is maintained in connection with the shaft 64 by means of a snap ring 72 retained within an appropriate snap ring groove formed in one extremity of the threaded shaft. An adjustment head or knob 74 may be provided at one extremity of the threaded adjustment shaft, which knob assists in maintaining the threaded shaft in assembly with the support element 26 and also facilitates manual adjustment of the position of the adjustment arm and the projector carrier to which the arm is attached. The threaded shaft 64, being received within the threaded bore 56 of the adjustment nut 54, establishes a driving connection between the adjustment shaft and the adjustment arm 52 and, therefore, rotary manipulation of the knob achieves pivotal movement of the adjustment arm 52 about the pitch axis defined by axial shaft 42.

As the adjustment arm 52 is moved in one rotary direction or the other by rotation of the adjustment knob 74, the adjustment nut 54 is moved linearly, thereby varying or changing the distance between the shafts 42 and 58 throughout the length of adjustment movement in either direction. To compensate for changes in the distance between shafts 42 and 58, the adjustment arm 52 may be provided with an elongated opening 76 that receives the shaft 58 of the adjustment nut 54. The elongated opening receiving the shaft 58, establishes a lost-motion connection between the adjustment arm 52, the threaded shaft and the drive nut that facilitates smooth adjustment of the arm 52 and the carrier element 44.

As depicted in FIG. 2, the lowermost projector is supported on the right side thereof by a projector carrier element that may be pivotally connected to the vertical support element 24. As shown in FIG. 9, the vertical support element 24 may be constructed to define a boss 80 having a blind bore 82 formed therein and defining a journal for an axial shaft 84 to which the projector carrier 78 is immovably connected. The projector carrier element 78 may be similarly configured as compared to the projector element 44 depicted in FIGS. 6, 7 and 8 and may be secured to the frame structure of a projector by means of set screws 86 that may be properly adjusted by means of an Allen wrench or other suitable tool that may be inserted through adjustment apertures 88 formed in the vertical support 24.

The axial shafts 42 and 84 carrying the projector carrier elements 44 and 78, respectively, cooperate to define a "pitch" axis about which the projector carriers and the projector secured thereto may be rotatably and controllably moved. When it is desired to change the pitch position of the projector about the axis 42, it is simply necessary to manipulate the adjustment knob 74, thereby imparting rotary movement to the threaded shaft 64 and, through the lost-motion connection between the adjustment arm 52 and the adjustment nut 54, the adjustment arm 52 is controllably moved in rotatable manner about the pitch axis defined by the shaft 42. To achieve yaw and roll movement of the lowermost projector to properly align the projected image thereof on a projector screen, it is simply necessary to manipulate the adjustment screws 20 provided in the support base 12 and thereby alter the position of the support base relative to a support surface or support element upon which the projector stand may rest. The plurality of adjustment screws 20 facilitate limited adjustment of the stand 10 about pitch, roll and yaw axes.

Figure 4:
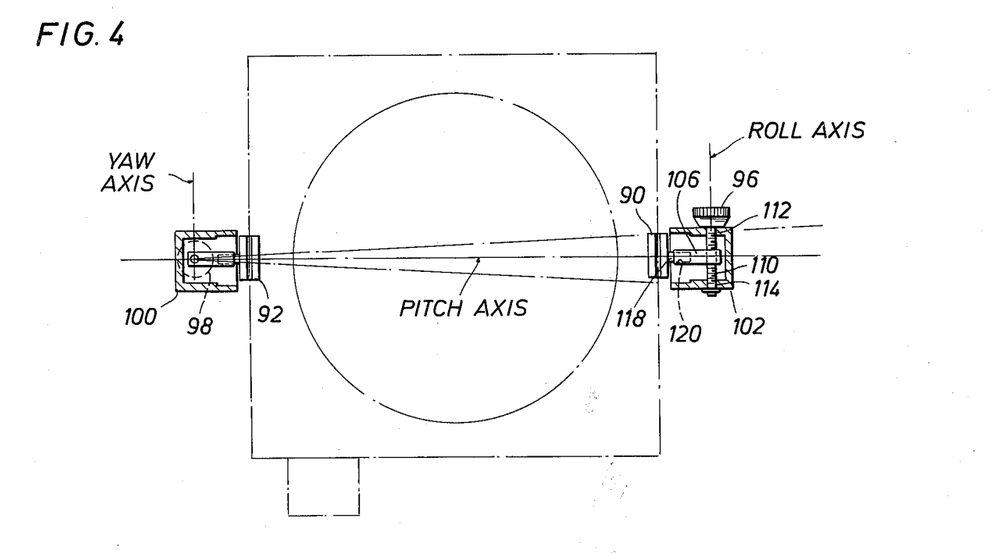
FIG. 4 is a sectional view of the projector stand assembly of FIGS. 1-3 in plan and taken along line 4—4 in FIG. 3, illustrating the mechanism for controlling the position of the projector relative to a yaw axis.

It will be desirable to provide other projectors carried by the projector stand with a universal adjustment mechanism in order to properly align the images of the other projectors relative to the projector having single axis pitch adjustment control as described above. In accordance with the present invention, one suitable form of universal adjustment may conveniently take the form illustrated generally in FIGS. 2, 3 and 4 hereof and illustrated more specifically in FIGS. 5 and 10–12. Referring to FIG. 2, a pair of projector carrier elements 90 and 92 are shown to support a projector in similar manner as discussed above in connection with the projector carrier elements 44 and 78. The position of the uppermost projector may be adjusted universally by means of a pitch control knob 94, a yaw control knob 96 and a control knob 98 for achieving controlled movement of the projector about a roll axis.

Figure 10:
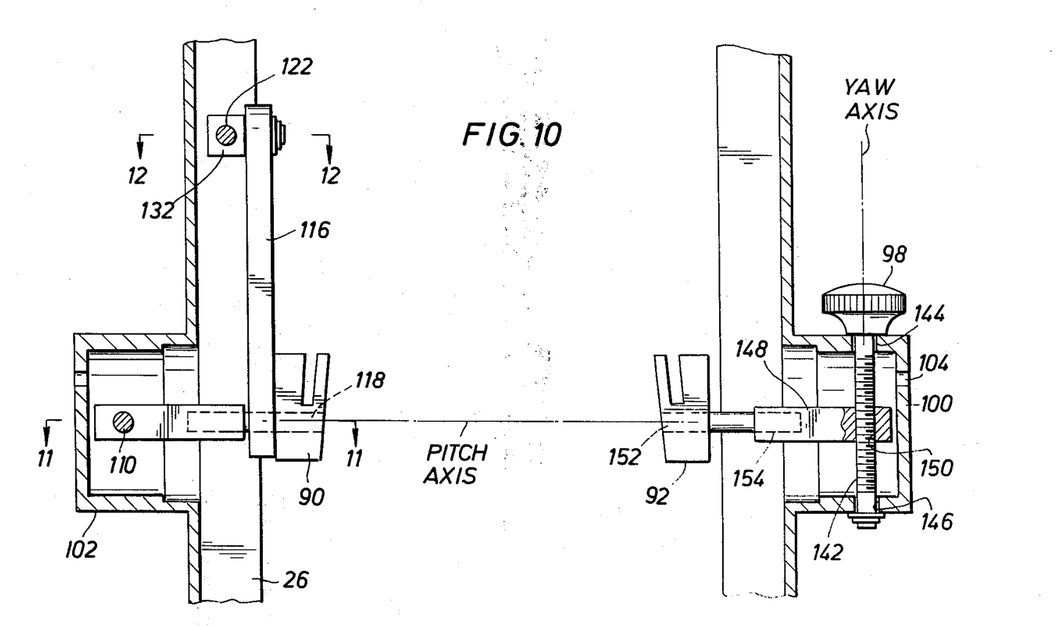
FIG. 10 is a fragmentary sectional view in elevation illustrating one of the upper projector carrier and adjustment mechanisms for controlling the yaw, roll and pitch positions of the projector relative to the projector stand of FIGS. 1-3.

As shown in FIG. 10, the vertical supports 24 and 26 may be provided with structure defining external bosses 100 and 102 having set screw adjustment openings 104 formed therein through which an Allen wrench or other suitable tool may be extended for adjusting set screws that secure the projector structure to the respective carrier elements 90 and 92.

Figure 11:
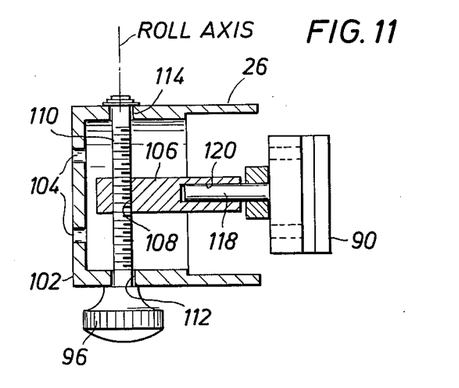
FIG. 11 is a sectional view in plan, taken along line 11—11 in FIG. 10 and showing the yaw adjustment control mechanism in detail.

For adjusting the position of the projector relative to a yaw axis to be discussed hereinbelow, a yaw adjustment bar 106 shown in FIG. 11 may be provided having a threaded aperture 108 formed therein through which may be extended a threaded adjustment shaft 110 that is in turn rotatably supported by opposed journal apertures 112 and 114 defined in opposed aligned relation in the boss 102. As the yaw adjustment knob 96 is rotated, the yaw adjustment bar 106 is moved laterally with respect to the boss structure of the vertical support element 26.

Pitch adjustment of the projector carrier element 90 may be accomplished by means of a pitch adjustment arm 116 that may be secured in immovable relation to the carrier element 90 and in laterally immovable relation to the yaw adjustment bar 106. The carrier element 90 may be provided with an axial shaft 118 that may be received within a blind bore 120 defined in the yaw adjustment bar in order to establish a pivotal or axial connection about which the projector carrier element 90 may rotate.

Figure 5:
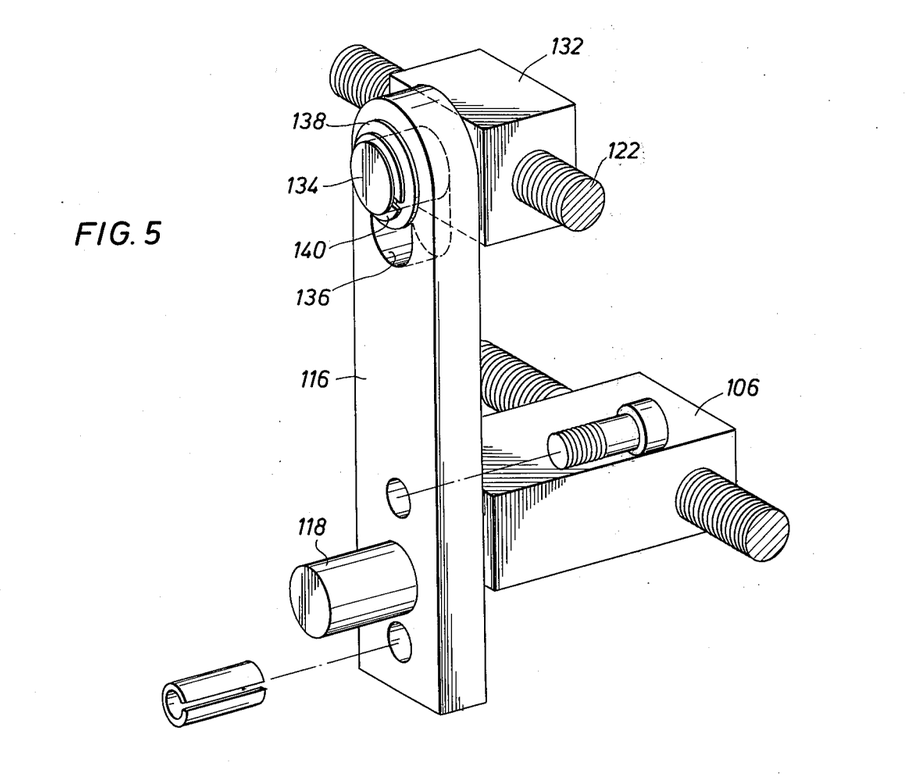
FIG. 5 is an isometric view of the mechanism utilized for adjustably controlling the pitch and yaw positions of the projector relative to pitch and yaw axes defined within the projector support mechanism and shown in FIG. 4.
Figure 12:
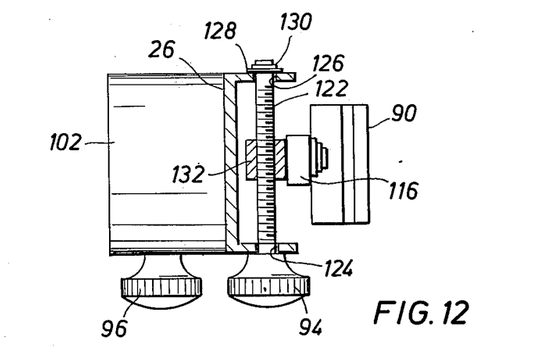
FIG. 12 is a fragmentary sectional view taken along line 12—12 in FIG. 10 and depicting the pitch adjustment control mechanism in detail.

As shown in FIG. 12, which is a sectional view taken along line 12—12 in FIG. 10, a threaded adjustment shaft 122 may be rotatably supported by opposed journal apertures 124 and 126 defined in the support element 26 and may be retained in position by the adjustment knob 94 and by a washer 128 retained by a snap ring 130 in the manner described above in connection with FIG. 7. The adjustment arm 116 may be secured by means of a lost-motion connection to an adjustment nut 132 through which the threaded shaft 122 extends. As shown in FIG. 5, the adjustment nut 132, through which the threaded shaft 122 extends, may be provided with a connector shaft 134 that may extend through an elongated opening 136 formed in the adjustment arm 116. A flat washer 138 and a retainer ring 140, received within an appropriate retainer ring groove formed in the shaft 34, establish a lost-motion connection between the drive nut 132 and the adjustment arm 116, thereby compensating for changes in distance between the shaft 134 and the shaft 118 as the adjustment arm 116 is rotated about the axial shaft.

Adjustment of the projector about a "roll" axis may be accomplished by upward or downward movement of the projector carrier 92 about a roll axis defined by the axis of the threaded shaft 110, which axis is described in detail hereinbelow in conjunction with the pitch and yaw axes. One suitable means for accomplishing controllable manipulation of the projector about the roll axis may conveniently take the form of a threaded shaft 142 shown in FIG. 10 that may be rotatably secured within opposed journal apertures 144 and 146 defined within the boss 100 by means of a washer and snap ring arrangement similar if not identical to that discussed above in connection with FIGS. 7 and 12, with the adjustment knob 98 serving to support the shaft 142 against thrust loads in one direction.

An adjustment bar 148 may be provided having an internal threaded bore 150 that receives the threaded shaft 152, thereby causing the bar 148 to be driven linearly as the shaft 142 is rotated when the adjustment knob 98 is manually manipulated. The projector carrier 92 may be provided with an axial shaft 152 that may be received within a blind bore 154 formed in the adjustment bar 148, thereby insuring that the projector carrier element 92 is rotatable relative to the adjustment bar.

As indicated above, the projector or projectors carried by the universal adjustment mechanisms is intricately adjustable in universal manner in order that the projected image of the uppermost projectors may be very accurately coordinated with the projector having single axis adjustment. This feature is facilitated, not only because the projector is adaptable for movement about pitch, roll and yaw axes, but also because each of the axes are movable one relative to the other. The pitch axis may be defined by a line extending axially through the shafts 118 and 152 depicted in FIGS. 10 and 11. As the adjustment arm 116 is moved by manipulation of the pitch adjustment knob 94, the projector carrier elements 90 and 92 will be caused to rotate about the pitch axis and the image of the projector on the projector screen will be caused to move vertically on the screen.

When it is desired to move the projected image on the screen to the right or left, in horizontal manner, on the projector screen, this can be accomplished simply by manipulation of the position control adjustment knob 96 that imparts movement to the projector about a yaw axis defined by the center line of the rotatable threaded shaft 142 also shown in FIG. 10. It should be borne in mind that as the yaw control mechanism is actuated by rotating the yaw adjustment knob 96, the position of the pitch axis will also change, thereby causing vertical movement of the image of the projector to be offset either right or left depending upon the position of the yaw adjustment control mechanism. Likewise, when the roll adjustment knob 98 is rotated to cause pivoting of the projector about the roll axis defined by the threaded shaft 110, the position of the pitch axis will be further altered and the pitch axis may be effectively coordinated with the yaw and roll axes to accomplish intricate positioning of the projected image on the projector screen relative to the image projected by another one of the projectors supported by the projector stand. Another effective way to visualize the relationship between the pitch, roll and yaw axes is that the threaded shaft of the yaw adjustment mechanism also defines the roll axis while the threaded shaft of the roll adjustment mechanism defines the yaw axis. The relative position of the pitch axis is varied relative to the horizontal or relative to the position of the projector stand by varying either or both of the roll and yaw control axes. It is therefore apparent that movement of the yaw, roll and pitch adjustment mechanisms may be coordinated in any desirable way to achieve optimum relative positioning of projected images from two or more projectors. If it is desirable to coordinate the projected images from three or more projectors, a number of universal projector position control mechanisms constructed in accordance with the present invention may be employed either in vertically stacked manner or in horizontally oriented manner, for example, to achieve multiple positioning of projected images.

The present invention provides a novel low cost mechanism for effectively achieving precise orientation of two or more projectors, which may be either slide or motion picture projectors or a selective mixture of both, if desirable, to achieve desirable multi-media results. The projectors may be positively secured in removable manner to projector carrier elements that may be effectively manipulated in universal manner to achieve various positioning of the projectors. Moreover, the projectors may remain assembled in the projector stand in stacked manner, such as depicted in the drawings or in any other desirable oriented relationship, thereby facilitating easy transportation of multiple projectors for quick and simple transportation and to facilitate quick set up in the event the multi-media projector system is to be moved and set up for multi-media display on short notice. The stand, with the projectors intact, may be carried simply by raising the stand by means of the support handle 34 and by carrying the support stand as one would carry a suitcase, for example. For purposes of storage, the multi-media stand, with the projectors carried therein, may be disposed within a storage container in simple manner.

All that is necessary for transporting the projectors and projector stand to a site in setting up the system for multi-media display is simply resting the multi-media stand on a support surface, such as a table, for example. The projected image of the lowermost projector then may be properly oriented on a projector screen simply by adjusting the adjustment screws 20 of the support base 12 and by achieving proper pitch orientation of the projector image by means of the single axis pitch adjustment control mechanism. The other projectors carried by the projector stand may be then adjusted relative to the projected image of the first projector by simple and quick adjustment of the pitch, roll and yaw control mechanisms. In a very few minutes time the multi-media projector stand, with two or more projectors contained therein, may be set up and properly adjusted for multi-media operation. In view of the foregoing, it is apparent that the present invention is one well adapted to attain all of the objects hereinabove set forth, together with other advantages which will become obvious and inherent from a description of the apparatus itself.

It will be understood that certain combinations and subcombinations are of utility and may be employed without reference to other features and subcombinations. As many possible embodiments may be made of the invention without departing from the spirit thereof, it is to be understood that all matters herein set forth or shown in the accompanying drawings are to be interpreted as illustrative and not in a limiting sense.

What is claimed is:

1. A multi-media projector stand for supporting at least two projectors in order that the projected images from said projectors may be coordinated in any suitable manner, said projector stand comprising:

a base element having opposed upright support elements extending therefrom;

first axis means being defined by said upright support elements and being disposed in transverse relation to said upright support elements;

a first pair of projector carrier elements being adapted to be secured in fixed relation to a first one of the projectors to be controllably supported, said first pair of projector carrier elements being rotatably received by said first axis means;

second axis means being defined by said upright support elements and being disposed in transverse relation to said upright support elements;

a second pair of projector carrier elements being adapted to be secured in fixed relation to a second one of said projectors to be controllably supported, said second pair of projector carrier elements being pivotally received by said second axis means; and means for controllably adjusting the orientation of said second axis means relative to said first axis means and achieving controllable positioning of said second pair of projector carrier elements and thus controllably adjusting the position of said second one of said projectors relative to the position of said first projector.

2. A multi-media projector stand as recited in claim 1, wherein said base element comprises:

a substantially rigid element having a plurality of support feet carried thereby, each of said support feet being adjustable relative to said base element and being manipulatable to achieve universal adjustment of said base element relative to a support upon which said base element rests.

3. A multi-media projector stand as recited in claim 1, wherein:

said first axis means being defined by first opposed journal means defined in each of said upright support elements;

said second axis means being defined by second opposed journal means formed on said upright support elements; and said means for controllably adjusting the orientation of said second axis means being adjustment means provided on each of said second opposed journal means and being manipulatable to achieve desired movement of selected ones of said first and second journal means.

4. A multi-media projector stand as recited in claim 1, wherein:

said projector carrier means each having a shaft extending therefrom and being received in respective ones of said journal means and supporting the projector for rotation about said second axis; and means for adjustably controlling rotational positioning of said projector carrier means about said second axis.

5. A multi-media projector stand as recited in claim 3, wherein said means for controllably adjusting the pivotal position of said projector carrier means about said first pivotal axis comprises:

actuating arm means extending from at least one of said projector carrier means and being disposed in substantially normal relation to said shaft and having means defining a threaded adjustment bore; and manipulator screw means being rotatably carried by one of said upright elements and being disposed in threaded engagement with said threaded bore, said manipulator screw being rotatable for adjustment of the position of said actuating arm means.

6. A multi-media projector stand as recited in claim 1, wherein said means for supporting said second one of said projectors comprises:

means carried by said support frame means and defining a yaw axis about which said second one of said projectors is rotatable;

yaw control means for adjustably controlling the position of said second one of said projectors about said yaw axis;

means carried by said support frame means defining a roll axis about which said second one of said projectors is rotatable;

roll control means for adjustably controlling the position of said second one of said projectors about said roll axis;

means carried by said support frame means defining a pitch axis about which said second one of said projectors is rotatable;

pitch control means for adjustably controlling the position of said second one of said projectors about said pitch axis; and said yaw, roll and pitch control means being selectively manipulable for controlling the position of said second projector relative to said first of said projectors for coordinated positioning of the projected images of said projectors.

7. A multi-media projector stand as recited in claim 6, wherein:

said means defining said pitch axis comprises opposed journal means being defined in said support frame means and being disposed in axial alignment;

projector carrier means being adapted for connection to a projector to be movably supported relative to said pitch axis, said projector carrier means having shaft means receivable within said opposed journal means and establishing rotatable positioning of said projector carrier means and said projector about pitch axis; and means carried by said support frame means and controllably adjusting the rotatable position of said projector carrier means and said second one of said projectors relative to said pitch axis and said support frame.

8. A multi-media projector stand as recited in claim 7, wherein said means for controllably adjusting the rotatable position of said projector carrier means about said pitch axis comprises:

actuating arm means extending from at least one of said projector carrier means and being disposed in substantially normal relation to said shaft means; and adjustment means being carried by said support frame means and being disposed in engagement with said actuating arm means, said adjustment means being manipulatable for adjustment of the rotatable position of said actuating arm said projector carrier and said projector about said pitch axis.

9. A multi-media projector stand as recited in claim 6, wherein said roll control means comprises:

means establishing roll axis means at one side of said support frame means;

roll adjustment means carried by the opposite side of said support frame; and means supporting said second one of said projectors between said roll axis means and said roll adjustment means and being controllably rotatable about said roll axis means upon manipulation of said roll adjustment means.

10. A multi-media projector stand as recited in claim 6, wherein said yaw control means comprises:

said yaw axis being defined on one side of said support frame means; and said yaw control means being disposed on the opposite side of said support frame means and, when manipulated, being operative to impart rotatable movement to one of said projector carrier means about said yaw axis.

11. A multi-media projector stand for supporting at least two projectors in order that the projected images from said projectors may be coordinated in any desirable manner on a screen, said projector stand comprising:

support frame means including a base element and a pair of support elements extending in generally parallel spaced relation from said base element;

means on said support frame defining a pitch axis about which one of said projectors may be rotatably positioned;

a first pair of projector carrier elements being supported by said support elements and cooperating to support a first one of said projectors;

first pitch adjustment means being carried by said support frame means and being manipulatable for controlling rotational positioning of said first pair of projector carrier elements and said first one of said projectors about said pitch axis;

means on said support elements defining a second pitch axis about which a second one of said projectors is rotatably positioned;

a second pair of projector carrier elements being supported by said support elements and cooperating to support said second one of said projectors;

second pitch adjustment means being carried by said support frame means and being manipulatable for controlling rotational positioning of said second pair of projector carrier elements and said second one of said projectors about said second pitch axis;

means on one side of said support frame defining a yaw axis;

yaw adjustment means being carried by said support frame means and being manipulatable for controlling rotational positioning of said second pair of projector carrier elements and said second projector about said yaw axis;

means on said support frame defining a roll axis; and roll adjustment means being carried by said support frame means and being manipulatable for controlling rotational positioning of said second pair of projector carrier elements and said second projector about said roll axis.

12. A multi-media projector stand as recited in claim 11, wherein said first and second pitch adjustment means each comprises:

actuating arm means extending from at least one of each of said first and second pairs of projector carrier elements and being disposed in substantially normal relation to the respective ones of said first and second pitch axes; and said first and second pitch adjustment means being engagable with said actuating arm means and being manipulatable for controllable adjustment of the rotatable position of each of said actuating arms, said first and second projector carrier means and said first and second projectors about each of said first and second pitch axes.

13. A multi-media projector stand as recited in claim 11, wherein the distance between said pitch axis and the place of engagement between each of said pitch adjustment means and the respective actuating arm means changes during pitch adjustment; and lost-motion connection means is provided between said pitch adjustment means and the respective actuating arm means to compensate for said changes in distance.

14. A multi-media projector stand for supporting at least one projector in order that the position of the projector may be universally controlled for precise positioning of the image projected on a screen, said stand comprising:

support frame means;

a pair of opposed projector carrier elements being movably supported by said support frame means and being adapted to support said projector, said projector elements cooperating to establish a generally horizontally disposed pitch axis about which rotatable positioning of the projector is controlled;

actuating arm means extending from at least one of said projector carrier elements and being disposed in transverse relation to said pitch axis; and pitch adjustment means being carried by said support frame means and, upon being manipulated, causing rotational movement of said actuating arm means, said projector carrier elements and said projector about said pitch axis.

15. A multi-media projector stand as recited in claim 14, wherein:

said pitch adjustment means is an adjustment screw rotatably carried by said support frame means;

means disposed adjacent the free extremity of said actuating arm threadedly receiving said adjustment screw and causing said actuating arm to rotate about said pitch axis upon rotation of said adjustment screw; and lost-motion connection means establishing connection between said pitch adjustment screw and said actuating arm.

16. A multi-media projector stand as recited in claim 15, wherein said lost-motion connection means comprises:

an elongated opening being formed in said actuating arm means;

said means adjacent the free extremity of said actuating arm means being a connector element having internal screw threads for receiving the threads of said adjustment screw and having a connection pin extending through said elongated opening of said actuating arm means; and means securing said connection pin within said elongated opening.

17. A multi-media projector stand as recited in claim 14, wherein said support frame additionally defines roll and yaw axes about which said projector carrier elements may be controllably rotated and includes roll control means and yaw control means for controlling positioning of said projector;

said roll control means defining said yaw axis; and said yaw control means defining said roll axis.

* * * * *

UNITED STATES PATENT OFFICE
CERTIFICATE OF CORRECTION

PATENT NO. : 3,912,385

DATED : October 14, 1975

INVENTOR(S) : John R. Stokes, James R. Morphew, James R. Benes, Eric N. Broline, Robert E. Harlan It is certified that error appears in the above-identified patent and that said Letters Patent are hereby corrected as shown below:

Column 4, line 19, delete "13" and insert --12--.
Column 6, line 11, after "knob" insert --74--.

Signed and Sealed this ninth Day of March 1976

[SEAL]

Attest:

RUTH C. MASON
*Attesting Officer*

C. MARSHALL DANN
*Commissioner of Patents and Trademarks*